(No Model.)

F. M. FERRELL.
SCALE BEAM.

No. 357,658. Patented Feb. 15, 1887.

Witnesses
James M. Caxton
J. W. Garner

Inventor
F. M. Ferrell
By his Attorneys
C. A. Snowden

UNITED STATES PATENT OFFICE.

FLAVEL MARION FERRELL, OF TOCCOPOLA, MISSISSIPPI.

SCALE-BEAM.

SPECIFICATION forming part of Letters Patent No. 357,658, dated February 15, 1887.

Application filed May 5, 1886. Serial No. 201,214. (No model.)

*To all whom it may concern:*

Be it known that I, FLAVEL MARION FERRELL, a citizen of the United States, residing at Toccopola, in the county of Pontotoc and State of Mississippi, have invented a new and useful Improvement in Scale-Beams, of which the following is a specification, reference being had to the accompanying drawings.

My invention relates to an improvement in scale-beams; and it consists in the peculiar construction and combination of devices, that will be more fully set forth hereinafter, and particularly pointed out in the claim.

Figure 1:
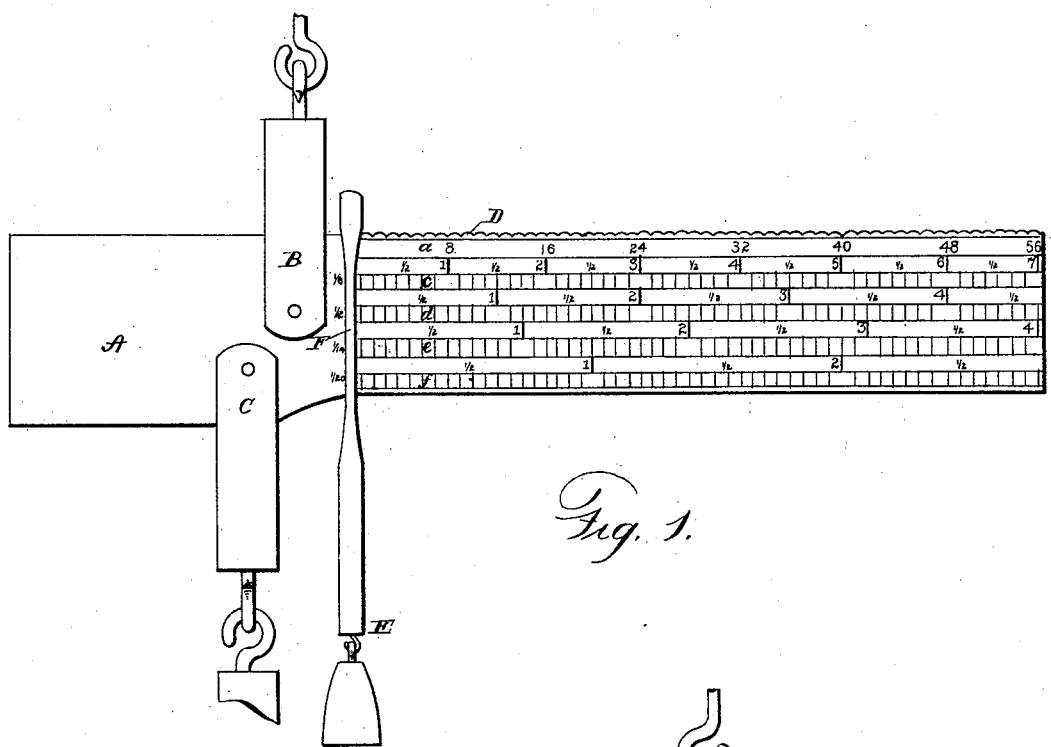
Figure 2:
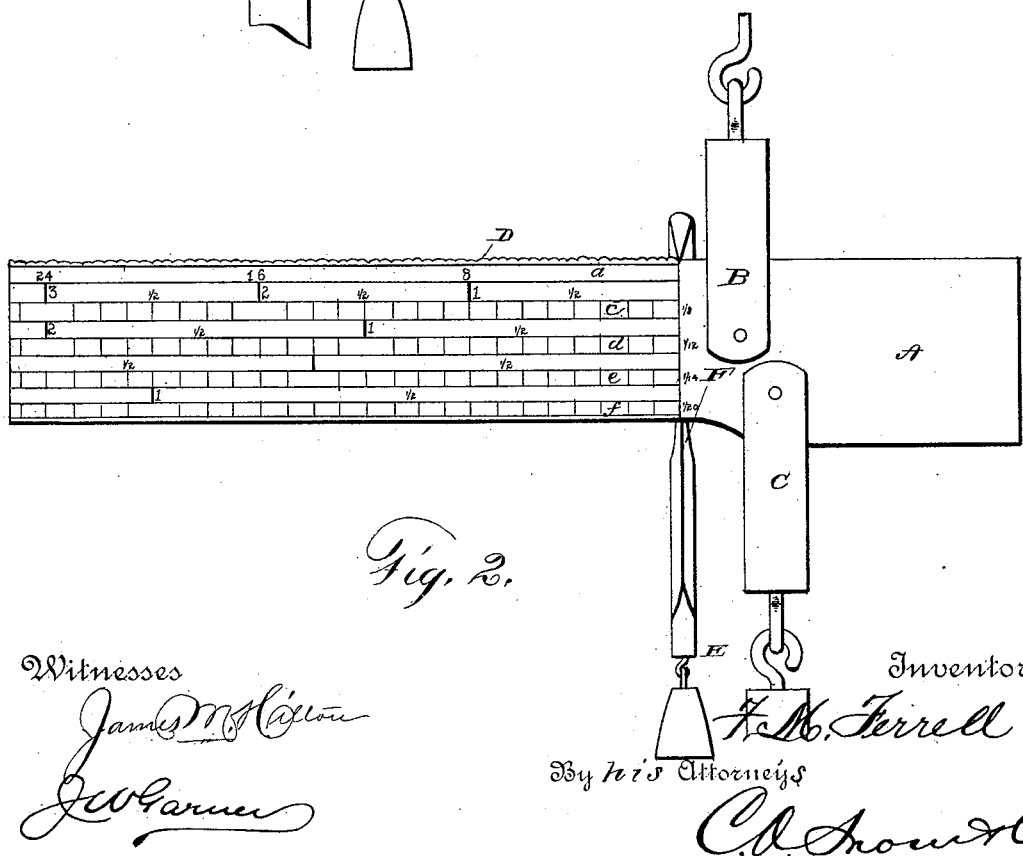

In the drawings, Figure 1 is a side elevation of a scale-beam embodying my improvements. Fig. 2 is a reverse elevation of the same.

A represents the scale-beam, which is pivoted to and suspended from the hanger B.

C represents the hanger, which is attached to the scale-beam, and from which the produce, grain, or other articles to be weighed are suspended in the usual way.

The upper edge of the scale A is serrated or notched, thereby forming teeth D, each of which indicates a pound, and which are numbered from the inner to the outer end of the beam, in the usual manner, as shown.

E represents the usual suspended weight, having the suspending link F, forming a hook, which is adapted to catch in the serrations on the upper edge of the scale-beam.

It is customary among millers and ginners to take their pay or toll in cotton or grain, and the object of my invention is to provide a scale-beam which will indicate, when the cotton or grain is weighed, what proportion of the same is due the ginner or miller as his toll, and thus avoid mistakes in computing the same.

The numbers indicating the pounds on the scale-beam constitute a scale, $a$, beneath which is inscribed a scale, $c$, indicating eighths, and provided with a series of numbers above the said scale, indicating pounds. Thus 1 in the scale $c$ is in line with the number 8 of the scale $a$, 2 of the scale $c$ is in line with 16 of the scale $a$, and so on throughout the length of the scale. Thus, if twenty-four pounds of grain are carried to the mill, and the miller receives one-eighth of the grain as his toll for grinding the same, when the weight is moved to figure 24 of the scale $a$ it will be in line with figure 3 of the scale $c$, thereby indicating that the miller's eighth part of the grain amounts to three pounds. Below the scale $c$ is inscribed a scale, $d$, indicating twelfths, and numbered in the same manner as the scale $c$, and beneath the scale $d$ is a scale, $e$, indicating fourteenths, and likewise numbered, and under the said scale $e$ is another scale, $f$, indicating twentieths, and likewise numbered, and so on. The scale-beam may be inscribed with any desired number of scales indicating any fractional part desired of the weight indicated on the scale $a$.

The operation of my invention will be readily understood from the foregoing description and by reference to the accompanying drawings.

Having thus described my invention, I claim—

In a weighing-scale, the combination of the scale-beam having the scale $a$, indicating pounds, and inscribed with scales $c\ d\ e$, &c., aligning with scale $a$ and indicating fractional parts of the weight indicated on the scale $a$, and the sliding weight-link F on the scale-beam, for the purpose set forth, substantially as described.

In testimony that I claim the foregoing as my own I have hereto affixed my signature in presence of two witnesses.

FLAVEL MARION FERRELL.

Witnesses:
LIZZIE FERRELL,
A. C. CAMPBELL.